(12) United States Patent
Seo et al.

(10) Patent No.: US 9,246,538 B2
(45) Date of Patent: Jan. 26, 2016

(54) METHOD AND DEVICE FOR DECODING SIGNAL IN WIRELESS COMMUNICATION SYSTEM

(71) Applicant: LG ELECTRONICS INC., Seoul (KR)

(72) Inventors: Inkwon Seo, Anyang-si (KR); Hanbyul Seo, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/357,103

(22) PCT Filed: Nov. 9, 2012

(86) PCT No.: PCT/KR2012/009461
§ 371 (c)(1),
(2) Date: May 8, 2014

(87) PCT Pub. No.: WO2013/070020
PCT Pub. Date: May 16, 2013

(65) Prior Publication Data
US 2014/0307757 A1    Oct. 16, 2014

Related U.S. Application Data

(60) Provisional application No. 61/557,884, filed on Nov. 9, 2011, provisional application No. 61/645,050, filed on May 9, 2012.

(51) Int. Cl.
*H04B 1/707* (2011.01)
*H04L 5/00* (2006.01)
(52) U.S. Cl.
CPC .............. *H04B 1/707* (2013.01); *H04L 5/0023* (2013.01); *H04L 5/0048* (2013.01); *H04L 5/0053* (2013.01)

(58) Field of Classification Search
CPC .................................. H04B 7/04; H04B 1/707
USPC .......................................... 375/147, 267, 324
See application file for complete search history.

(56) References Cited

U.S. PATENT DOCUMENTS

| 2009/0245187 A1* | 10/2009 | Nam et al. ..................... 370/329 |
| 2010/0195614 A1 | 8/2010 | Nimbalker et al. |
| 2011/0044391 A1 | 2/2011 | Ji et al. |
| 2011/0200143 A1 | 8/2011 | Koo et al. |
| 2011/0243066 A1* | 10/2011 | Nayeb Nazar et al. ....... 370/328 |
| 2012/0008586 A1 | 1/2012 | Kwon et al. |
| 2012/0014320 A1* | 1/2012 | Nam et al. ..................... 370/328 |
| 2013/0195031 A1* | 8/2013 | Hessler et al. ................. 370/329 |
| 2014/0037019 A1* | 2/2014 | Akkarakaran et al. ........ 375/267 |

FOREIGN PATENT DOCUMENTS

| KR | 10-2010-0042210 A | 4/2010 |
| KR | 10-2010-0112084 A | 10/2010 |
| KR | 10-2011-0020732 A | 3/2011 |

* cited by examiner

*Primary Examiner* — Jaison Joseph
(74) *Attorney, Agent, or Firm* — Birch, Stewart, Kolasch & Birch, LLP

(57) ABSTRACT

One embodiment of the present invention relates to a method for allowing a terminal to decode a signal in a wireless communication system, and the method for decoding the signal comprises the steps of determining a spreading factor for a physical resource block pair included in a subframe; and decoding a decoding reference signal on said physical resource block pair by using an orthogonal sequence corresponding to said spreading factor.

9 Claims, 8 Drawing Sheets

FIG. 5
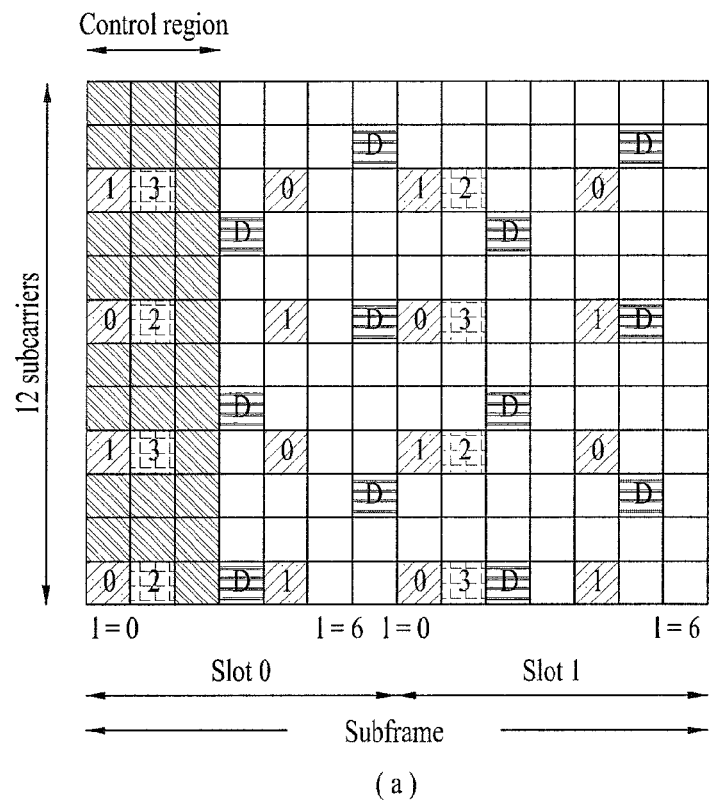
(a)
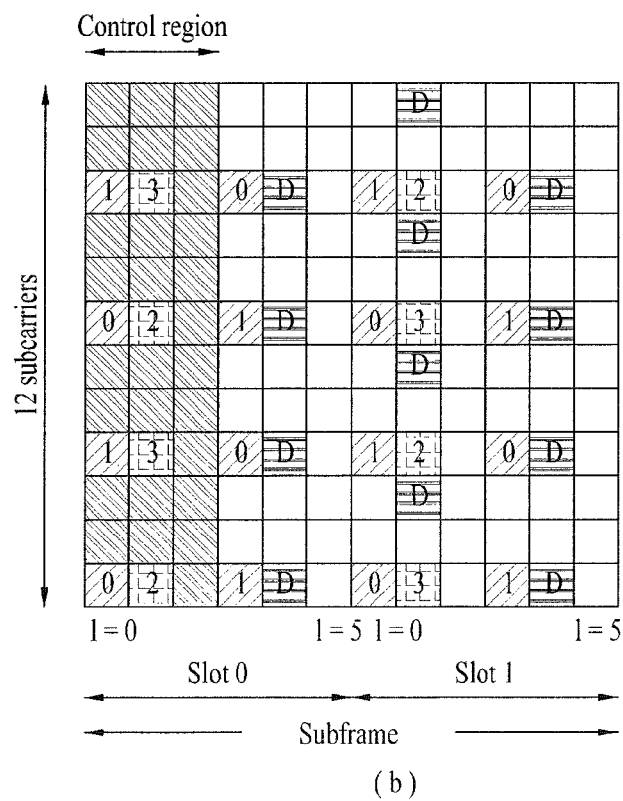
(b)

METHOD AND DEVICE FOR DECODING SIGNAL IN WIRELESS COMMUNICATION SYSTEM

CROSS REFERENCE TO RELATED APPLICATIONS

This application is the National Phase of PCT/KR2012/009461 filed on Nov. 9, 2012, which claims priority under 35 U.S.C. 119(e) to U.S. Provisional Application No. 61/557,884 filed on Nov. 9, 2011 and U.S. Provisional Application No. 61/645,050 filed on May 9, 2012, all of which are hereby expressly incorporated by reference into the present application.

TECHNICAL FIELD

Embodiments of the present invention relate to a wireless communication system, and more particularly to a method and apparatus for decoding signals.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide methods for deciding a spreading factor and/or demodulation reference signal (DMRS) overhead needed for decoding a DMRS for channel estimation, and decoding signals using the decided spreading factor and DMRS overhead.

It is to be understood that technical objects to be achieved by the present invention are not limited to the aforementioned technical objects and other technical objects which are not mentioned herein will be apparent from the following description to one of ordinary skill in the art to which the present invention pertains

Technical Solution

The object of the present invention can be achieved by providing a method for decoding a signal by a user equipment (UE) in a wireless communication system including: determining a spreading factor of a physical resource block (PRB) pair contained in a subframe; and decoding a demodulation reference signal (DMRS) of the PRB pair using an orthogonal sequence corresponding to the spreading factor.

In accordance with another aspect of the present invention, a user equipment (UE) device for use in a wireless communication system includes: a transmission (Tx) module; and a processor, wherein the processor is configured to determine a spreading factor of a physical resource block (PRB) pair contained in a subframe, and decode a demodulation reference signal (DMRS) of the PRB pair using an orthogonal sequence corresponding to the spreading factor.

The first and second technical aspects may include all or some parts of the following items.

The spreading factor may be decided on the basis of the number of UEs multiplexed on the PRB pair. The number of UEs may be estimated from the number of control channel elements (CCEs) contained in the PRB pair. At least one of the number of UEs and the number of CCEs may be received from a base station (BS) through higher layer signaling.

The number of CCEs may be decided on the basis of the number of resource elements (REs) available in the PRB pair.

The number of CCEs may be decided by a following equation, $$\text{number of } CCE = \left\lfloor \frac{\text{number of available } RE}{\text{number of } RE \text{ for } CCE} \right\rfloor \quad \text{[Equation]}$$

where "number of CCE" denotes the number of CCEs, "number of available CCE" denotes the number of available REs, and "number of RE for CCE" denotes the number of REs needed for the CCE, wherein "number of RE for CCE" denotes the number of REs used for transmission of the signal within the PRB pair.

The spreading factor may be decided on the basis of any one of the number of antenna ports used in transmission of the signal contained in the PRB pair or a number of each antenna port used in the signal transmission. The number of antenna ports or the number of each antenna port may be received from a base station (BS) through higher layer signaling.

The spreading factor may be decided according to which one of subframe sets that are predetermined depending upon the spreading factor includes the subframe.

The spreading factor is set to 2 when the number of multiplexed UEs is set to 4 or less, and is set to 4 when the number of multiplexed UEs is higher than 4.

The method may further include: performing channel estimation using the decoded DMRS; and decoding the signal on the PRB pair using the result of channel estimation.

The signal may be an Enhanced-Physical Downlink Control Channel (E-PDCCH).

Advantageous Effects

As is apparent from the above description, exemplary embodiments of the present invention can decide a spreading factor and/or DMRS overhead even though the number of UEs multiplexed in a pair of physical resource blocks according to a variation of resources, resulting in implementation of efficient decoding. It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 5 is a conceptual diagram illustrating a reference signal (RS).

BEST MODE

Figure 1:
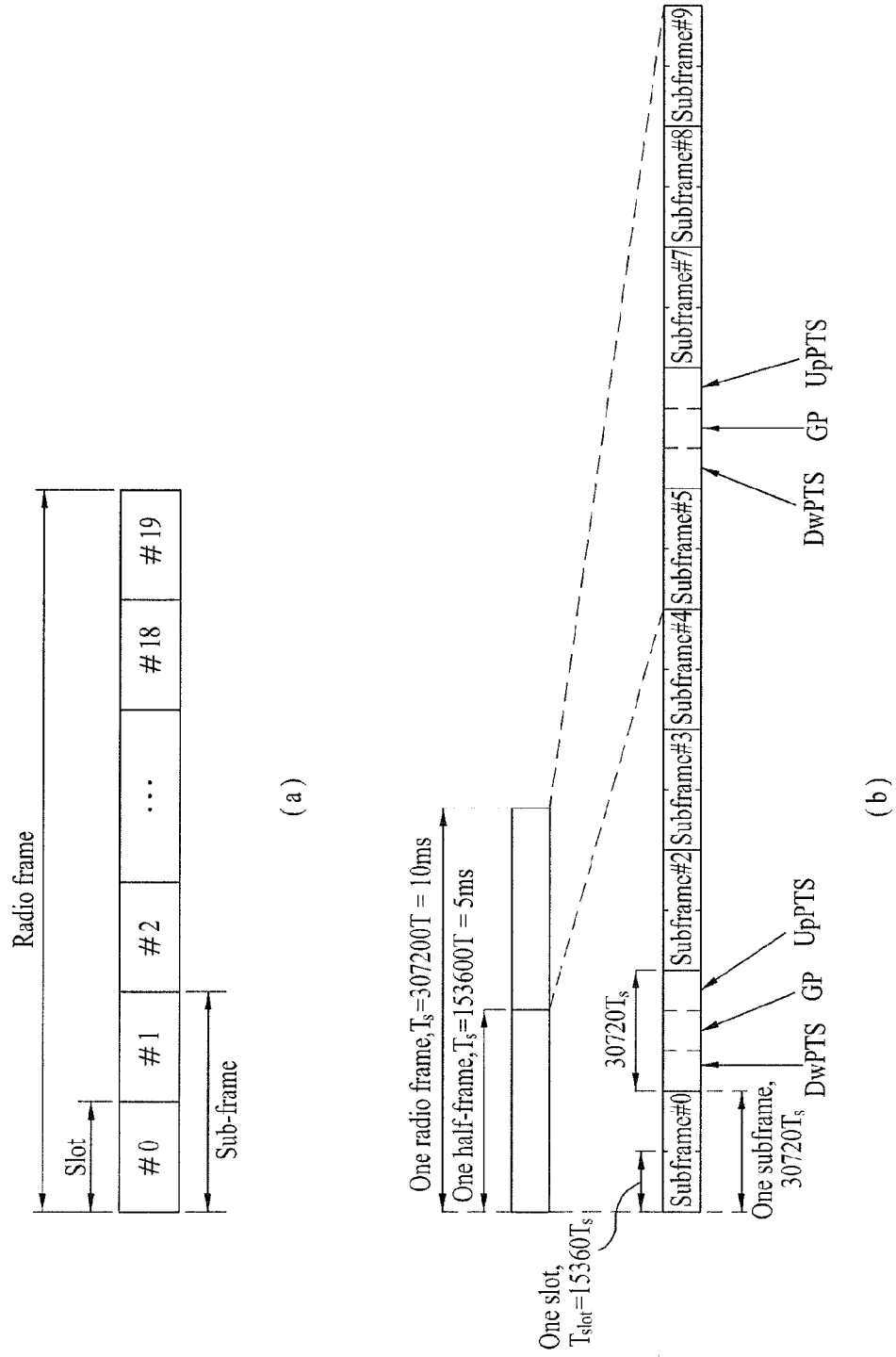
FIG. 1 exemplarily shows a downlink radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with the terms Relay Node (RN) or Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3$^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

A structure of a radio frame is explained with reference to FIG. 1.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 1(*a*) is a diagram for a structure of a type 1 radio frame. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 1(b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or a channel estimation in a user equipment. The UpPTS is used for channel estimation of a base station and matching a transmission synchronization of a user equipment. The guard period is a period for eliminating interference generated in uplink due to multi-path delay of a downlink signal between uplink and downlink. Meanwhile, one subframe includes 2 slots irrespective of a type of a radio frame.

The above-described structures of the radio frame are exemplary only. And, the number of subframes included in a radio frame, the number of slots included in the subframe and the number of symbols included in the slot may be modified in various ways.

Figure 2:
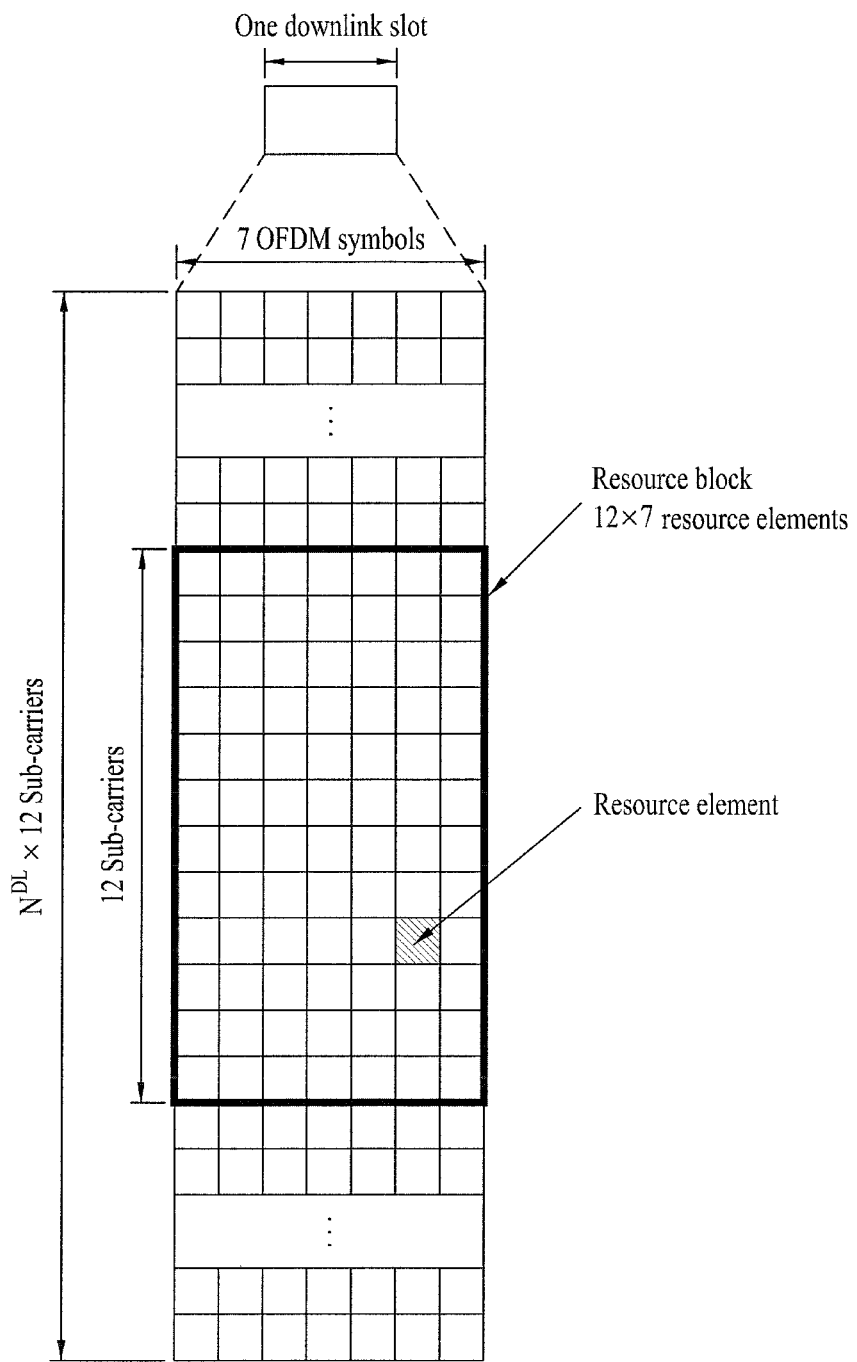
FIG. 2 exemplarily shows a resource grid of one downlink slot.

FIG. 2 is a diagram for a resource grid in a downlink slot. Referring to FIG. 2, one downlink (DL) slot includes 7 OFDM symbols and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
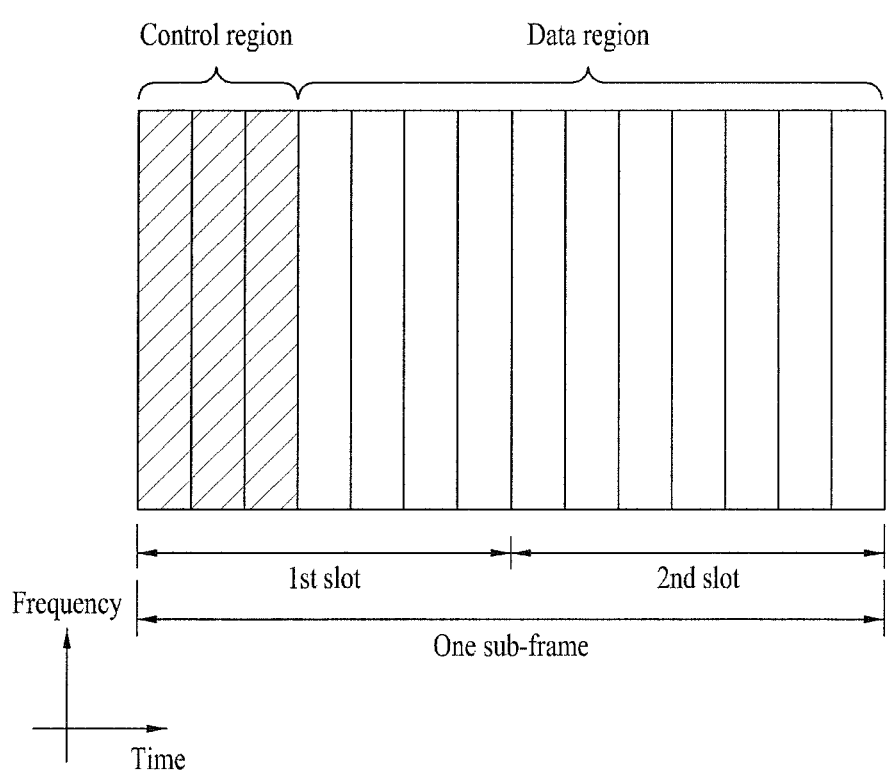
FIG. 3 exemplarily shows a downlink subframe structure.

FIG. 3 is a diagram for a structure of a downlink (DL) subframe. Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH is a response channel in response to UL transmission and includes an ACK/NACK signal. Control information carried on PDCCH may be called downlink control information (hereinafter abbreviated DCI). The DCI may include UL scheduling information, DL scheduling information or a UL transmit (Tx) power control command for a random UE (user equipment) group. PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Figure 4:
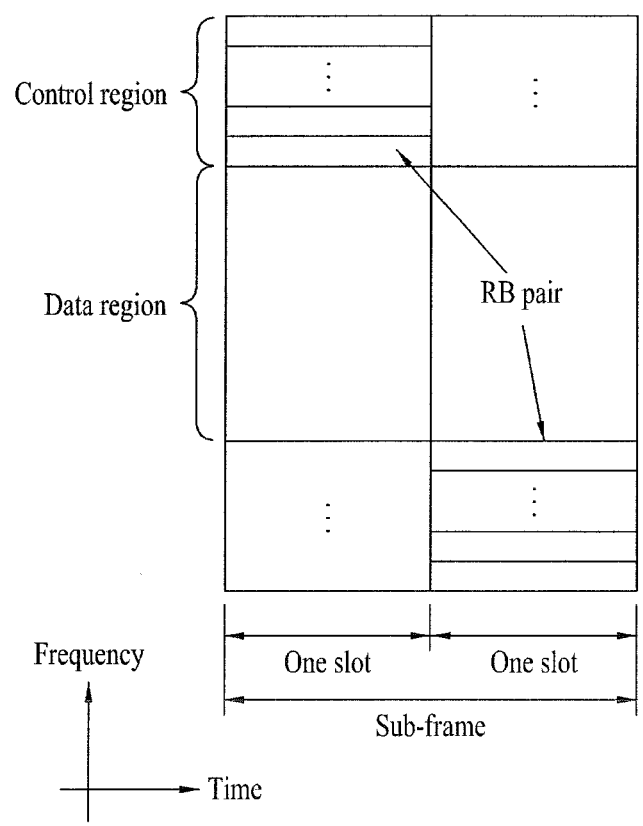
FIG. 4 exemplarily shows an uplink subframe structure.

FIG. 4 is a diagram for a structure of an uplink (UL) subframe. Referring to FIG. 4, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

Reference Signal (RS)

When packets are transmitted in a wireless communication system, since the transmitted packets are transmitted via a radio channel, signal distortion may occur in a transmission process. In order to enable a receiver to accurately receive the distorted signal, distortion of the received signal should be corrected using channel information. In order to detect the channel information, a method of transmitting a signal which is known to a transmitter and a receiver and detecting channel information using a distortion degree when the signal is received via the channel is mainly used. The signal is referred to as a pilot signal or a reference signal.

If data is transmitted and received using multiple antennas, a channel state between each transmission antenna and each reception antenna should be known in order to accurately receive a signal. Accordingly, a reference signal is present per transmission antenna and, more particularly, per antenna port.

The reference signal may be divided into an uplink reference signal and a downlink reference signal. In a current LTE system, the uplink reference signal includes:

i) a demodulation reference signal (DM-RS) for channel estimation for coherent demodulation of information transmitted via a PUSCH and a PUCCH, and ii) a sounding reference signal (SRS) for measuring uplink channel quality of a network at different frequencies at the BS.

The downlink reference signal includes:

i) a UE-specific reference signal for a specific UE, ii) a demodulation-reference signal (DM-RS) transmitted for coherent demodulation if a PDSCH is transmitted, iii) a channel state information-reference signal (CSI-RS) for delivering channel state information (CSI) if a downlink DMRS is transmitted, iv) an MBSFN reference signal transmitted for coherent demodulation of a signal transmitted in a multimedia broadcast single frequency network (MBSFN) mode, and v) a positioning reference signal used to estimate geographical position information of the UE.

The reference signals may be broadly divided into two reference signals according to the purpose thereof. There are a reference signal for acquiring channel information and a reference signal used for data demodulation. Since the former reference signal is used when the UE acquires channel information in downlink, the reference signal is transmitted over a wide band and even a UE which does not receive downlink data in a specific subframe should receive the reference signal. This reference signal is used even in handover. The latter reference signal is sent by the BS along with resources in downlink. The UE receives the reference signal to perform channel measurement and data modulation. This reference signal is transmitted in a region in which data is transmitted.

The CRS is used for two purposes such as channel information acquisition and data demodulation and the UE-specific reference signal is used only for data demodulation. The CRS is transmitted per subframe over a wide band and reference signals for a maximum of four antenna ports are transmitted according to the number of transmit antennas of the base station.

For example, if the number of transmit antennas of the base station is 2, CRSs for antenna ports 0 and 1 are transmitted and, if the number of transmit antennas of the base station is 4, CRSs for antenna ports 0 to 3 are transmitted.

Figure 7:
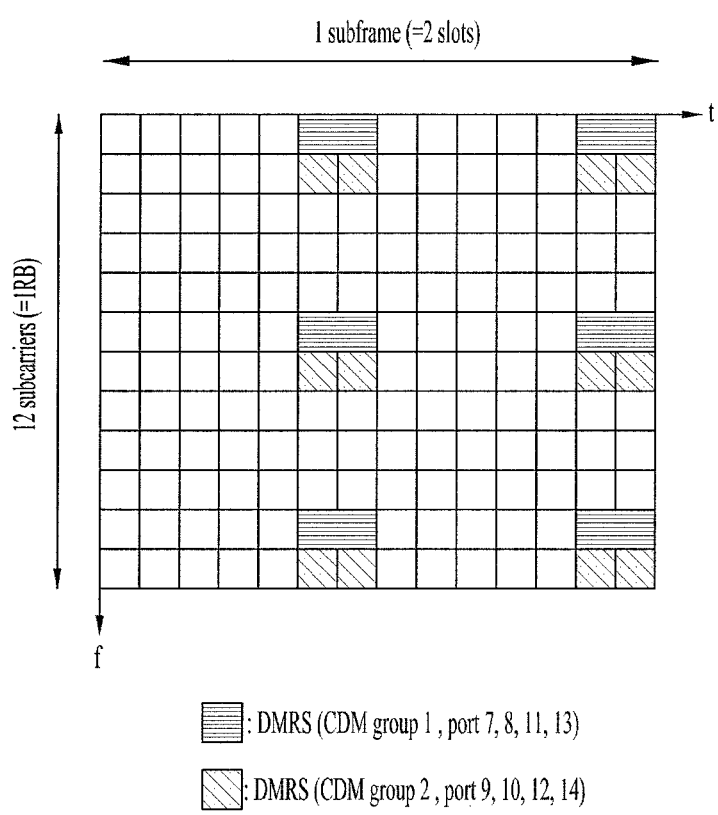

FIG. 7 is a diagram illustrating a pattern in which CRSs and DRSs defined in a legacy 3GPP LTE system (e.g., release-8) are mapped onto resource block (RB) pairs. A downlink RB pair as a mapping unit of a reference signal may be expressed by one subframe on a time axis and 12 subcarriers on a frequency axis. That is, one RB pair has 14 OFDM symbols in case of a normal CP (FIG. 7(a)) and 12 OFDM symbols in case of an extended CP (FIG. 7(b)).

FIG. 7 shows locations of the reference signals on the RB pairs in a system in which the base station supports four transmit antennas. In FIG. 7, resource elements (REs) denoted by "0", "1", "2" and "3" represent the locations of the CRSs for antenna port indices 0, 1, 2 and 3. Meanwhile, the RE denoted by "D" represents the location of the DMRS.

Demodulation Reference Signal (DMRS)

DMRS is a reference signal that is defined by a UE to implement channel estimation for PDSCH. DMRS may be used in Tx ports 7, 8, and 9. In the initial stages, although DMRS has been defined for transmission of a single layer corresponding to an antenna port 5, the DMRS has been extended for spatial multiplexing of a maximum of 8 layers. DMRS is transmitted only for a single specific UE as can be seen from a UE-specific reference signal (RS) corresponding to a different name of DMRS. Accordingly, DMRS can be transmitted only in RB in which PDSCH for the specific UE is transmitted.

Figure 6:
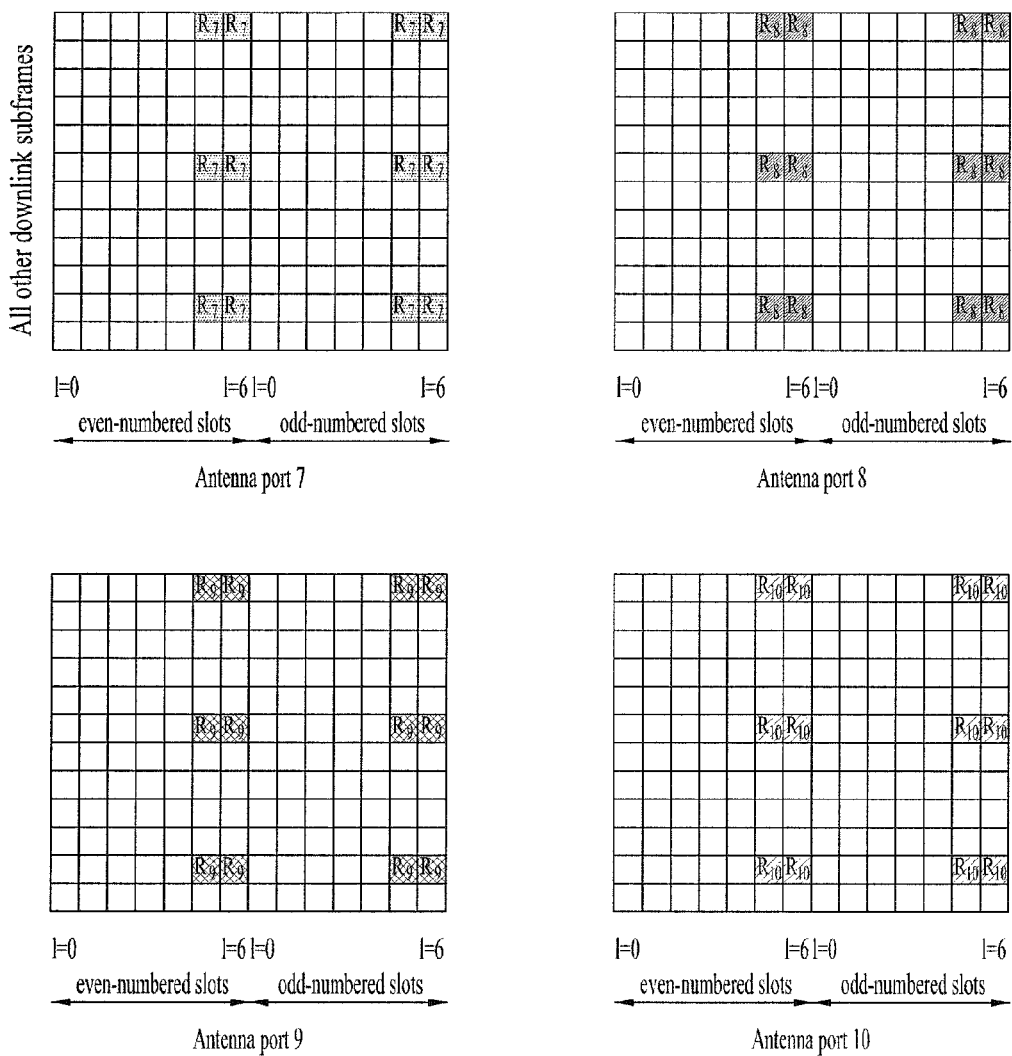
FIGS. 6 to 7 are conceptual diagrams illustrating a demodulation reference signal (DMRS).

DMRS generation for a maximum of 8 layers will hereinafter be described in detail. In case of DMRS, a reference signal sequence r(m) generated by Equation 1 may be mapped to a complex-valued modulation symbols $a_{k,l}^{(p)}$ obtained by Equation 2. FIG. 6 shows that DMRS is mapped to a resource grid of a subframe in case of a general CP, and relates to antenna ports 7 to 0.

$$r(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

In Equation 1, r(m) is a reference signal sequence, c(i) is a pseudo-random sequence, and $N_{RB}^{max,DL}$ is a maximum number of RBs of a downlink bandwidth.

$$a_{k,l}^{(p)} = w_p(l') \cdot r(3 \cdot l' \cdot N_{RB}^{max,DL} + 3 \cdot n_{PRB} + m') \quad \text{[Equation 2]}$$

$$w_p(i) = \begin{cases} \overline{w}_p(i) & (m' + n_{PRB})\bmod 2 = 0 \\ \overline{w}_p(3-i) & (m' + n_{PRB})\bmod 2 = 1 \end{cases}$$

$$k = 5m' + N_{sc}^{RB} n_{PRB} + k'$$

$$k' = \begin{cases} 1 & p \in \{7, 8, 11, 12\} \\ 0 & p \in \{9, 10, 12, 14\} \end{cases}$$

$$l = \begin{cases} l'\bmod 2 + 2 & \text{Case of special subframe} \\ & \text{configurations 3, 4, 8, 9} \\ l'\bmod 2 + 2 + 3\lfloor l'/2 \rfloor & \text{Case of special subframe} \\ & \text{configurations 1, 2, 6, 7} \\ l'\bmod 2 + 5 & \text{Case in which special} \\ & \text{subframe is not given} \end{cases}$$

$$l' = \begin{cases} 0, 1, 2, 3 & n_s\bmod 2 = 0, \text{Case of special subframe} \\ & \text{configurations 1, 2, 6, 7} \\ 0, 1 & n_s\bmod 2 = 0, \text{Case in which special subframe} \\ & \text{configurations 1, 2, 6, 7 are not given} \\ 2, 3 & n_s\bmod 2 = 1, \text{Case in which special subframe} \\ & \text{configurations 1, 2, 6, 7 are not given} \end{cases}$$

$$m' = 0, 1, 2$$

As can be seen from Equation 2, an orthogonal sequence $\overline{w}_p(i)$ shown in the following Table 1 is applied to the reference signal sequence r(m) when r(m) is mapped to a complex modulation symbol.

TABLE 1

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |

TABLE 1-continued

| Antenna port p | $[\bar{w}_p(0)\ \bar{w}_p(1)\ \bar{w}_p(2)\ \bar{w}_p(3)]$ |
|---|---|
| 11 | [+1 +1 −1 −1] |
| 12 | [−1 −1 +1 +1] |
| 13 | [+1 −1 −1 +1] |
| 14 | [−1 +1 +1 −1] |

DMRS may perform channel estimation in different ways according to a spreading factor 2 or 4. Referring to Table 1, an orthogonal sequence is repeated in the form of [a b a b] at antenna ports 7 to 10, such that the spreading factor is set to 2 at antenna ports 7~10 and the spreading factor is set to 4 at antenna ports 11~14. In case that the spreading factor is set to 2, a UE may despread each of a DMRS of a first slot and a DMRS of a second slot to the spreading factor of 2, and then performs channel estimation through time interpolation. In case that the spreading factor is set to 4, DMRS of the entire subframe is despread to the spreading factor 4 at one time, such that channel estimation can be performed.

In case of using the spreading factor of 2, the spreading-factor based channel estimation scheme may acquire not only a gain obtained because time interpolation is applied at high mobility, but also a gain of a decoding time because despreading to DMRS of the first slot is possible. In case of using the spreading factor of 4, the spreading-factor based channel estimation scheme can also support many more UEs or ranks.

The DMRS overhead aspect will hereinafter be described with reference to FIG. 7. FIG. 7 shows that DMRS is mapped to a subframe at each of the antenna ports 7 to 14. As shown in FIG. 7, DMRS may be classified into CDM (Code Divisional Multiplexing) Group 1 and CDM Group 2 according to a resource-grid mapping position. In an RE corresponding to CDM Group 1, DMRS is transmitted through antenna ports 7, 8, 11, and 13. In an RE corresponding to CDM Group 2, DMRS is transmitted through antenna ports 9, 10, 12, and 14. Assuming that DMRS is transmitted only using the antenna port corresponding to CDM Group 1, the number of resource elements (REs) needed for DMRS is 12. That is, DMRS overhead is denoted by 12. Likewise, if the antenna port corresponding to CDM Group 2 is used, DMRS overhead is denoted by 24.

In LTE system from Release 11, an Enhanced-PDCCH (E-PDCCH) has been used to address not only insufficiency of PDCCH capacity caused by CoMP (Coordinate Multi Point) and MU-MIMO (Multi User-Multiple Input Multiple Output), but also reduction of PDCCH performance caused by inter-cell interference. In order to obtain the precoding gain or the like, E-PDCCH may perform channel estimation on the basis of DMRS in a different way from the legacy CRS-based PDCCH.

E-PDCCH of Release 11 may be composed of FDM or (FDM+TDM). In accordance with E-PDCCH based on FDM, E-PDCCH of many UEs should be multiplexed to one PRB pair. For example, in case of using a normal CP, 168 REs are made available when PDCCH, CRS, and DMRS overhead are not considered in one PRB pair, and this means that the normal CP includes 4 CCEs (where CCE=36 REs). In addition, in the case of using E-PDCCH, if one CCE is divided into two sub-CCEs to obtain frequency diversity or the like and the two sub-CCEs are then transmitted, CCEs of different UEs may be contained in one PRB pair. This means that the UE should be identified by performing spreading with the spreading factor of 4. However, in case of considering REs needed for PDCCH, CRS, and DMRS overhead, if a guard period of a special subframe occupies a predetermined number of OFDM symbols in TDD, the amount of resources capable of being used as E-PDCCH is reduced. If the number of available CCEs is reduced and the number of UEs multiplexed to one PRB pair is reduced, the case of using the spreading factor of 2 occurs.

A base station (BS) configured to perform scheduling can naturally recognize the number of UEs multiplexed to one PRB pair, and can apply an appropriate spreading factor to DMRS generation. A UE is unable to recognize such information, such that the UE may have difficulty in recognizing which spreading factor will be used. That is, the UE may have difficulty in recognizing whether to perform DMRS decoding using an orthogonal sequence corresponding to a certain spreading factor. That is, a reference for deciding whether the UE will use the spreading factor 2 or 4 is needed.

A first embodiment of the present invention proposes a method for allowing the BS to perform signaling of the following content through RRC signaling or the like. In case of a normal CP, it is premised that the spreading factor used by the UE is set to 2 when there are four or less UEs, and it is also premised that the spreading factor used by the UE is set to 4 when there are five or more UEs. It is premised that the spreading factor for use in the extended CP is set to 2 when there are 2 or less UEs, and it is also premised that the spreading factor for use in the extended CP is set to 4 when there are three or more UEs. However, the relationship between the number of UEs and the spreading factor is only exemplary, and other combinations are also possible. In addition, the term "CCE" may include one case of 36 REs (=9 REGs) and the other case of a smaller size (e.g., 18 REs). In other words, CCE may indicate the amount of resources needed for E-PDCCH that is transmitted to one UE within one PRB pair Embodiment 1

A detailed description of information signaled by a base station (BS) in such a manner that the UE can decide the spreading factor will hereinafter be described in detail.

First, a base station (BS) may directly indicate the spreading factor to be used by the UE. The BS may signal that the corresponding PRB pair should be despread with the spreading factor of 2 or 4. The BS may signal the above information using information of 1 bit. For example, if the signaling information is set to zero (0), this means the spreading factor of 2. If the signaling information is set to 1, this means the spreading factor of 4.

Second, a (maximum) number of CCEs contained in one PRB pair may be signaled. In this case, CCE may be understood as a basic unit that constructs E-PDCCH. The basic unit may also indicate another resource unit instead of CCE. In more detail, the BS may freely adjust the number of CCEs contained in one PRB pair, and may inform the UE of the number of CCEs. The UE may estimate the number of UEs used when E-PDCCH is transmitted to the same PRB pair according to the number of signaled CCEs, and may decide the spreading factor used in despreading on the basis of the estimated number of UEs.

Third, the number of UEs configured to receive E-PDCCH through the corresponding PRB pair can be indicated. In other words, the number of UEs multiplexed on the corresponding PRB pair can be signaled. The UE having received the signaling information may decide the spreading factor of 2 when the number of multiplexed UEs is set to 4 or less, and may decide the spreading factor of 4 when the number of multiplexed UEs is set to 5 or higher.

Fourth, the number of antenna ports or an index number of the antenna port, that are used in the entire E-PDCCH transmission of the PRB pair, may be signaled. The UE may decide the spreading factor through the number of antenna ports. Specifically, for the case in which the spreading factor is necessarily used as in the antenna ports 11, 12, 13, and 14, the antenna port number used in E-PDCCH transmission can be signaled.

In order to decide the spreading factor by the UE, information capable of being signaled by the BS may be signaled independently or collectively. In addition, each information may be a value specified for a subframe, and may be signaled for each subframe.

In addition, specific information capable of being signaled by the BS in such a manner that the UE can decide the spreading factor may be changed according to a subframe. This specific information may include the number of OFDM symbols for PDCCH, information regarding transmission or non-transmission of CRS, and specific information indicating that a subframe is a special subframe (e.g., the length of DwPTS) in case of TDD. Accordingly, the BS may further signal a set of subframes to which the above-mentioned spreading factor is applied. Alternatively, the subframe set may be pre-established according to the spreading factor. For example, after the spreading factor of 2 is used in the subframe set #1 and the spreading factor of 4 is used in the subframe set #2, the decided spreading factor is used according to whether the corresponding subframe belong to which set.

As described above, differently from the method for enabling a UE to estimate the spreading factor through additional signaling, a method for allowing a UE to estimate the spreading factor only using information of the legacy system will hereinafter be described in detail.

The UE may decide the spreading factor on the basis of the number of REs available in a PRB pair. In this case, the number of available REs may indicate the number of REs available in E-PDCCH. The number of available REs may be calculated by subtracting the number of used REs that are used by the number of OFDM symbols for PDCCH, information regarding transmission or non-transmission of CRS, and a special subframe configuration (specifically, the length of DwPTS), from a total number of REs of the PRB pair. When calculating the number of available REs, the UE may estimate the number of CCEs applied to the corresponding PRB pair through Equation 2, and it may be assumed that E-PDCCH is transmitted to all of the corresponding CCEs.

$$\text{number of } CCE = \left\lfloor \frac{\text{number of available } RE}{\text{number of } RE \text{ for } CCE} \right\rfloor \quad \text{[Equation 2]}$$

In Equation 2, number of CCE may denote the number of control channel elements (CCEs), number of available RE may denote the number of available resource elements (REs), and number of RE for CCE may denote the number of REs needed for the CCE.

After the number of CCEs contained in the PRB pair is calculated by Equation 2, if the number of CCEs is higher than a predetermined threshold value, the spreading factor may be set to 4. In this case, the threshold value may be 4 as shown in the above-mentioned example.

Although the above-mentioned contents have been disclosed on the assumption of a normal CP, it is obvious to those skilled in the art that the above contents can be applied to the extended CP according to the same or similar logical principles.

Meanwhile, although one PRB pair is used only for one UE in case of PDSCH, several UEs may be multiplexed to one PRB pair in case of E-PDCCH. Therefore, if information of another UE configured to use the corresponding PRB pair or information of E-PDCCH is not received, it is difficult to estimate DMRS overhead. Accordingly, a second embodiment (Embodiment 2) will disclose a method for deciding DMRS overhead in a similar way to the above-mentioned methods for deciding the spreading factor.

Embodiment 2

In accordance with a first method for enabling a UE to decide DMRS overhead in a PRB pair, the BS (or eNB) may directly inform the UE of DMRS overhead of the corresponding PRB pair through RRC signaling.

In a second method, the BS may inform the UE of the number of CDM groups contained in the corresponding PRB pair, the number of CCEs, the number of UEs, and the number of antenna ports through RRC signaling, and the UE may derive DMRS overhead of the corresponding PRB pair on the basis of the above information.

For example, if the number of UEs configured to use the corresponding PRB pair or the number of E-PDCCHs is higher than 3 or higher, the UE may determine DMRS overhead of the corresponding PRB pair to be 24.

Alternatively, DMRS overhead may be decided according to a maximum number of CCEs contained in the signaled PRB pair. In more detail, if a specific value that exceeds a predetermined number of CCEs or a predetermined number of UEs is signaled, the UE may set DMRS overhead to a maximum value (e.g., 24) and then decode E-PDCCH. For example, if the number of CCEs (or UEs) signaled by the BS is equal to or less than 2, DMRS overhead may be set to 12. If the number of CCEs (or UEs) signaled by the BS is higher than 2, DMRS overhead may be set to 24.

Third, the BS (or eNB) may decide DMRS overhead on the basis of an antenna port configuration signaled to the UE. In more detail, if the signaled antenna ports are contained in only one CDM group, DMRS overhead may be set to 12. If the signaled antenna ports are divided into two CDM groups and contained in only one CDM group, DMRS overhead may be set to 24. In more detail, if one PRB pair is divided into 4 CCEs and antenna ports used by 4 CCEs are denoted by {7, 8, 9, 10}, namely, if CCE→Port 7, CCE1→Port 8, CCE2→Port 9, and CCE3→Port 10 are decided, DMRS overhead is set to 24, so that E-PDCCH demodulation can be carried out (in this case, the spreading factor may be set to 2 according to Embodiment 1).

In another example, if CSI feedback of a UE is unavailable, E-PDCCH transmission may be carried out using the (shared) RS. In this case, all CCEs contained in the PRB pair may share the same antenna ports. In this case, antenna port configuration may be signaled in the form of {7, 7, 7, 7} or {9, 9, 9, 9}, and the UE may determine DMRS overhead to be 12 on the condition that the signaled antenna-5 ports are contained in only one CDM group.

The above-mentioned description assumes that the antenna port configuration signaled to the UE is used for E-PDCCH transmission within the corresponding PRB pair. In addition, the antenna ports may be used only for E-PDCCH applied to the corresponding UE, or may include other antenna ports to be used by other UEs. In other words, even in the case in which only one candidate of Aggregation Level #1 is contained in the corresponding PRB pair, the UE assumes that antenna ports are used for E-PDCCH transmission such that the UE can calculate DMRS overhead.

In addition to the method for signaling specific information needed for the BS (or eNB) configured to decide DMRS overhead, a method for employing the number of available REs needed when the spreading factor is decided can also be applied to the present invention. That is, the UE may estimate the number of available REs by synthesizing system information or the like. If the number of available REs is higher than a predetermined value (e.g., the amount of resources mapped to at least three CCEs), DMRS overhead may be set to 24.

Figure 8:
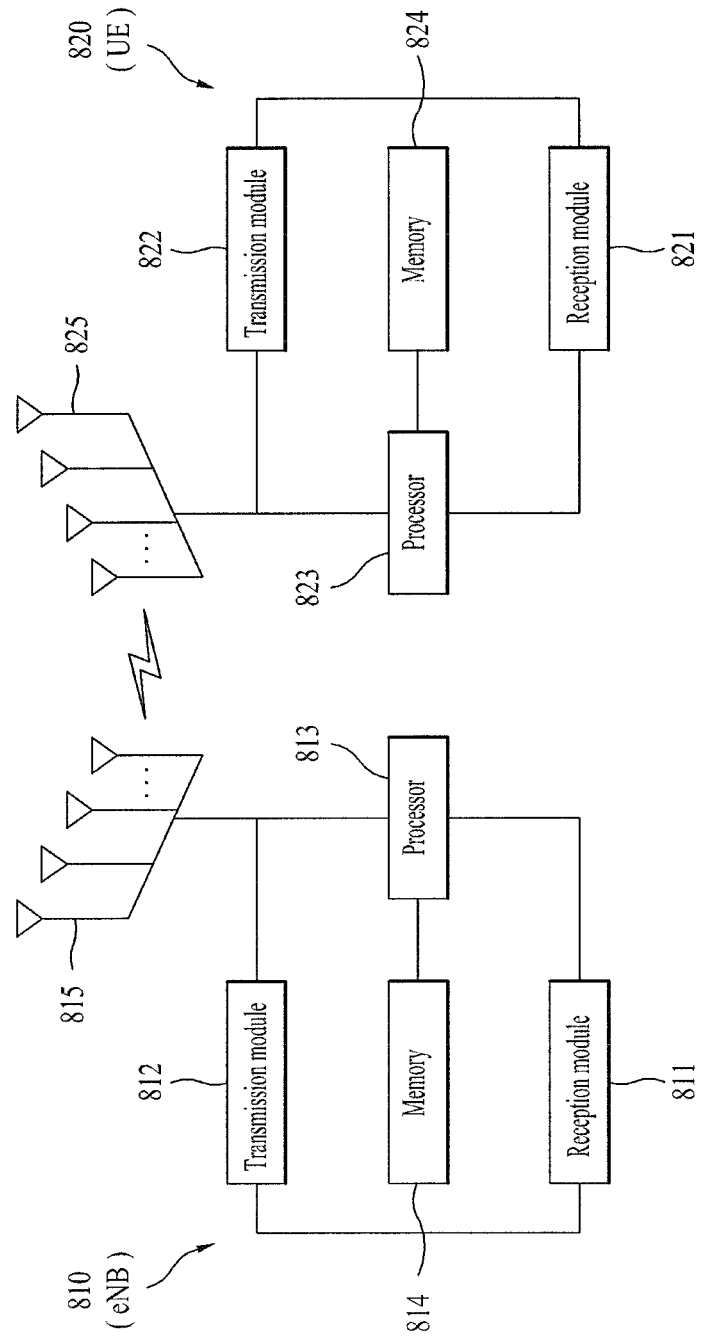
FIG. 8 is a block diagram illustrating a transceiver apparatus applicable to embodiments of the present invention.

FIG. 8 is a block diagram illustrating a transmission (Tx) point apparatus and a UE device according to embodiments of the present invention.

Referring to FIG. 8, the transmission point apparatus 810 according to the present invention may include a reception (Rx) module 811, a transmission (Tx) module 812, a processor 813, a memory 814, and a plurality of antennas 815. The plurality of antennas 815 indicates a transmission point apparatus for supporting MIMO transmission and reception. The reception (Rx) module 811 may receive a variety of signals, data and information on an uplink starting from the UE. The Tx module 812 may transmit a variety of signals, data and information on a downlink for the UE. The processor 813 may provide overall control to the transmission point apparatus 810.

The processor 813 of the transmission (Tx) point apparatus 810 according to one embodiment of the present invention can process various operations needed for the above-mentioned measurement report, handover, random access, etc.

The processor 813 of the transmission point apparatus 810 processes information received at the transmission point apparatus 810 and transmission information to be transmitted externally. The memory 814 may store the processed information for a predetermined time. The memory 814 may be replaced with a component such as a buffer (not shown).

Referring to FIG. 8, the UE device 820 may include an Rx module 821, a Tx module 822, a processor 823, a memory 824, and a plurality of antennas 825. The plurality of antennas 825 indicates a UE apparatus supporting MIMO transmission and reception. The Rx module 821 may receive downlink signals, data and information from the BS (eNB). The Tx module 822 may transmit uplink signals, data and information to the BS (eNB). The processor 823 may provide overall control to the UE device 820.

The processor 823 of the UE device 820 according to one embodiment of the present invention can process various operations needed for the above-mentioned measurement report, handover, random access, etc.

The processor 823 of the UE device 820 processes information received at the UE apparatus 820 and transmission information to be transmitted externally. The memory 824 may store the processed information for a predetermined time. The memory 824 may be replaced with a component such as a buffer (not shown).

The specific configurations of the transmission point apparatus and the UE device may be implemented such that the various embodiments of the present invention are performed independently or two or more embodiments of the present invention are performed simultaneously. Redundant matters will not be described herein for clarity.

The description of the transmission point apparatus 810 shown in FIG. 8 may be applied to a relay node (RN) acting as a DL transmission entity or UL reception entity without departing from the scope or spirit of the present invention. In addition, the description of the UE device 820 may be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention can be applied to a variety of mobile communication systems.

The invention claimed is:

1. A method for decoding a signal by a user equipment (UE) in a wireless communication system, the method comprising:
   determining a spreading factor of a physical resource block (PRB) pair contained in a subframe; and
   despreading a demodulation reference signal (DMRS) of the PRB pair using an orthogonal sequence corresponding to the spreading factor,
   wherein the spreading factor is decided on the basis of one of:

a) a number of UEs multiplexed on the PRB pair, or
b) any one of a number of antenna ports used in transmission of a signal contained in the PRB pair or a number of each antenna port used in the signal transmission, and
wherein the number of UEs is estimated from a number of control channel elements (CCEs) contained in the PRB pair.

2. The method according to claim 1, wherein at least one of the number of UEs and the number of CCEs is received from a base station (BS) through higher layer signaling.

3. The method according to claim 1, wherein the number of CCEs is decided on the basis of a number of resource elements (REs) available in the PRB pair.

4. The method according to claim 3, wherein the number of CCEs is decided by a following equation:

$$\text{number of } CCE = \left\lfloor \frac{\text{number of available } RE}{\text{number of } RE \text{ for } CCE} \right\rfloor, \quad \text{[Equation]}$$

where "number of CCE" denotes the number of CCEs, "number of available RE" denotes the number of available REs, and "number of RE for CCE" denotes the number of REs needed for the CCE.

5. The method according to claim 1, wherein the number of antenna ports or the number of each antenna port is received from a base station (BS) through higher layer signaling.

6. The method according to claim 1,
wherein the spreading factor is set to 2 when the number of multiplexed UEs is set to 4 or less, and
wherein the spreading factor is set to 4 when the number of multiplexed UEs is higher than 4.

7. The method according to claim 1, further comprising:
performing channel estimation using the DMRS; and
decoding the signal contained in the PRB pair using a result of the channel estimation.

8. The method according to claim 1, wherein the signal is an Enhanced-Physical Downlink Control Channel (E-PDCCH).

9. A user equipment (UE) device for use in a wireless communication system, the UE comprising:
a transmission (Tx) module; and
a processor,
wherein the processor is configured to:
determine a spreading factor of a physical resource block (PRB) pair contained in a subframe, and
despread a demodulation reference signal (DMRS) of the PRB pair using an orthogonal sequence corresponding to the spreading factor,
wherein the spreading factor is decided on the basis of one of:
a) a number of UEs multiplexed on the PRB pair, or
b) any one of a number of antenna ports used in transmission of a signal contained in the PRB pair or a number of each antenna port used in the signal transmission, and
wherein the number of UEs is estimated from a number of control channel elements (CCEs) contained in the PRB pair.

* * * * *